United States Patent [19]

Polityka

[11] Patent Number: 5,245,313
[45] Date of Patent: Sep. 14, 1993

[54] AUTOMATIC TRANSMISSION LEVER POSITION INDICATING DEVICE

[75] Inventor: Gregory A. Polityka, Oshawa, Canada

[73] Assignee: Atoma International, Inc., Ontario, Canada

[21] Appl. No.: 657,862

[22] Filed: Feb. 20, 1991

[51] Int. Cl.⁵ .............................................. B60Q 1/00
[52] U.S. Cl. ..................... 340/456; 200/61.88; 116/28.1; 74/473 R
[58] Field of Search ............ 340/456, 438, 461, 425.5, 340/815.12, 767, 762, 815.03; 200/61.88, 61.91; 116/28.1, 286, 288; 74/473 R, 491, DIG. 7; 362/29

[56] References Cited

U.S. PATENT DOCUMENTS

| 3,896,759 | 7/1975 | Ogura | 116/28.1 |
|---|---|---|---|
| 4,037,196 | 7/1977 | Atkinson et al. | 340/456 |
| 4,382,254 | 3/1983 | Ranalli | 340/767 |
| 4,785,615 | 11/1988 | Leigh-Monstevens | 200/61.88 |
| 4,878,453 | 11/1989 | Inoue | 116/288 |
| 4,882,572 | 11/1989 | Lippmann et al. | 340/456 |
| 4,888,577 | 12/1989 | Dunkley | 340/461 |
| 4,896,135 | 1/1990 | Deeds et al. | 340/456 |
| 5,009,128 | 4/1991 | Seidel | 340/456 |

FOREIGN PATENT DOCUMENTS

| 0106789 | 8/1983 | European Pat. Off. | |
| 0104898 | 9/1983 | European Pat. Off. | |
| 2621040 | 5/1976 | Fed. Rep. of Germany | |
| 267559 | 5/1989 | Fed. Rep. of Germany | 340/762 |
| 649032 | 1/1989 | Japan | 340/815.03 |

Primary Examiner—Jin F. Ng
Assistant Examiner—Christine K. Oda
Attorney, Agent, or Firm—Pennie & Edmonds

[57] ABSTRACT

An automatic transmission lever position indicating device comprising a housing including a face wall structure presenting within an opaque background a sequence of translucent characters corresponding in sequence with the positions of the lever. A circuit board is mounted within the housing including leads for receiving and transmitting signals including the input signals of the automatic transmission. An illuminating assembly is carried by the circuit board for illuminating all of the sequence of translucent characters and additionally indicating by illumination one of the sequence of translucent characters corresponding to the position the lever is in. The illuminating assembly includes a light emitting diode associated with each translucent character of the sequence, the light emitting diodes being connected with the leads for energizing the light emitting diodes in a manner determined by the input signals received so as to illuminate the one light emitting diode associated with the translucent character of the sequence corresponding to the position the lever is in so that the illumination of the associated one light emitting diode provides said additional indication by illumination.

4 Claims, 5 Drawing Sheets

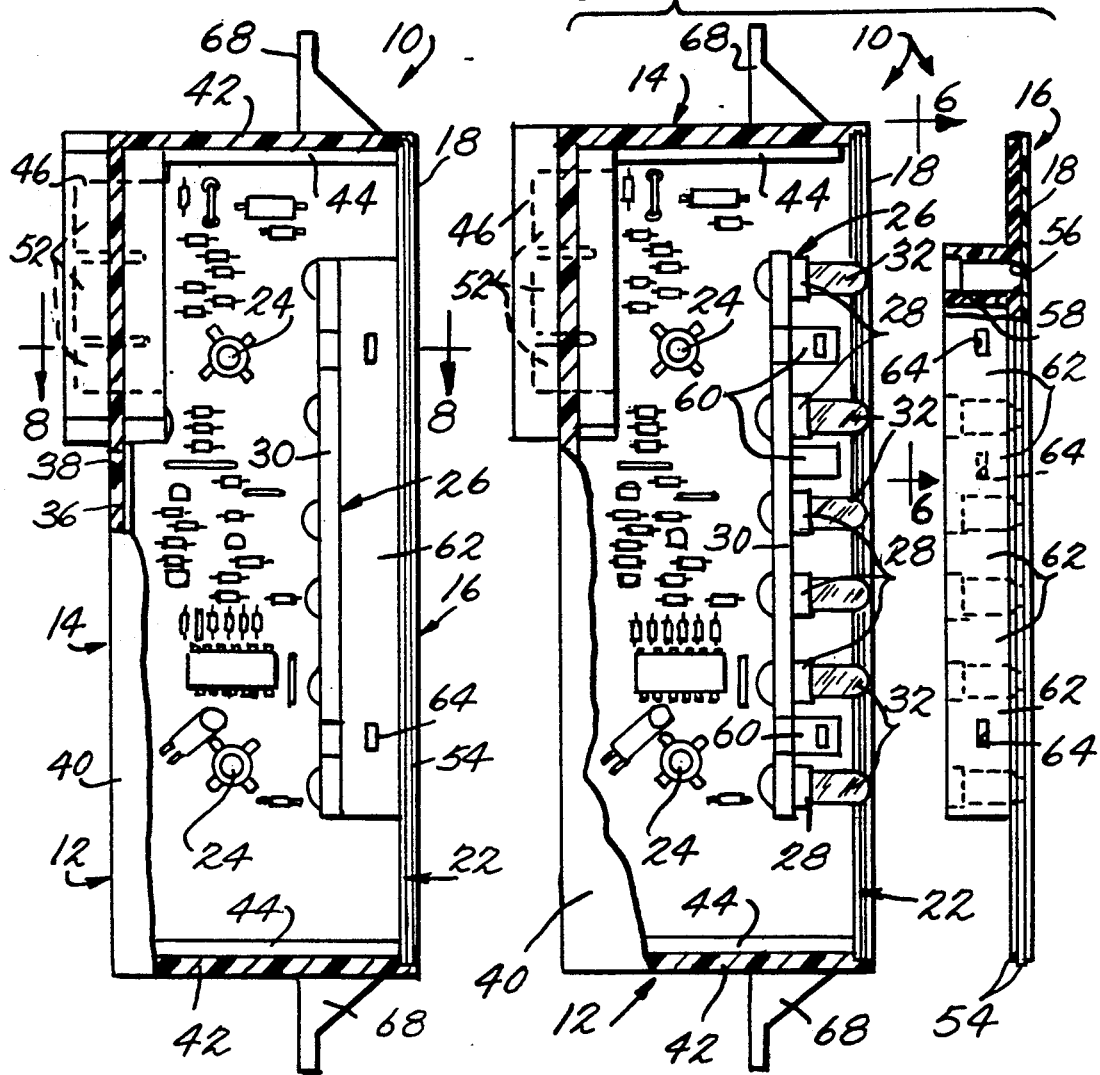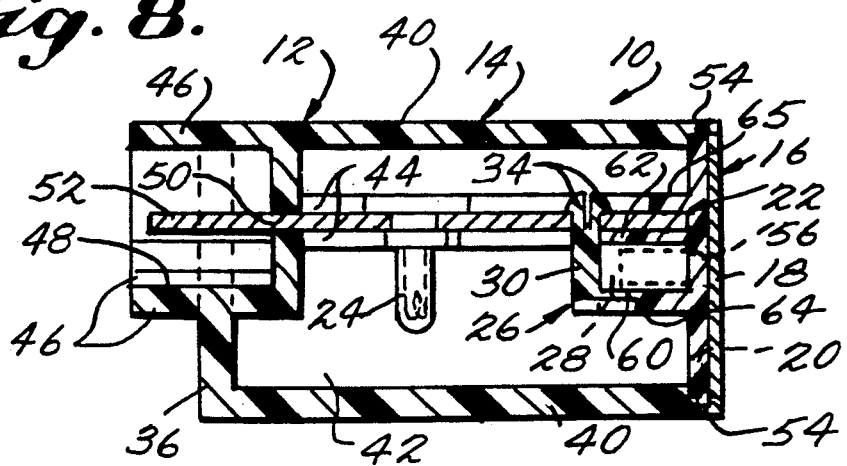

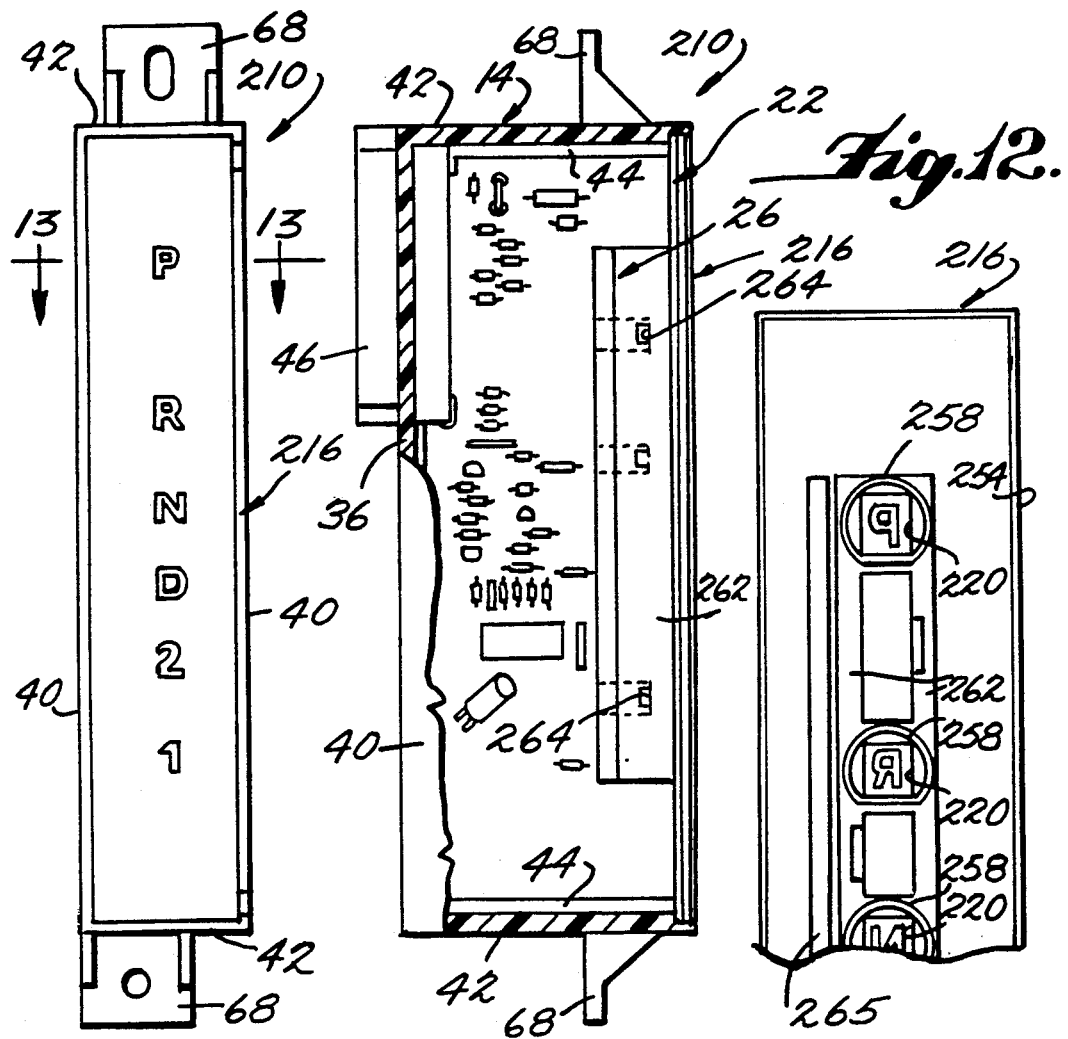

AUTOMATIC TRANSMISSION LEVER POSITION INDICATING DEVICE

This invention relates to visual indicating devices and more particularly to visual indicating devices of the type adapted to indicate the position of an automatic transmission lever in an automotive vehicle.

All automotive vehicles which have an automatic transmission include a means for visually indicating the position of the transmission shift lever within the predetermined sequence of positions provided. The usual situation is to provide an indicating means which is mechanically connected with the lever to provide an indication based upon the particular position of the lever. A typical example in this regard is to provide a pointer which is essentially fixed with respect to the lever to move through an indicating area containing distinctive characters representative of the sequence of positions so that, as the lever is moved through the sequence of positions, the pointer will point to the distinctive character representative of that position. Usage over a number of years has established the usage of "P" for the parking position, "R" for the reverse position, "N" for the neutral position, and "D" for the drive position. Where there are only two drive positions, the other drive position is indicated by an "L". Where there are three drive positions, the other two are designated by the numerals "2" and "1". A typical sequence is "PRNDL" for two drive position transmissions and "PRND21" for three drive position transmissions. In recent years, transmissions have been provided with an overdrive capability constituting a fourth forward speed and, when the lever is moved into the overdrive position, the distinctive character utilized is "OD". In this instance, the usual sequence is "PRNODD21".

There are several problems associated with a visual indicating arrangement which is dependent upon the physical position of the shift lever to indicate the position of the shift lever. The primary disadvantage is a lack of accuracy in alignment of the pointer with the indicia due to the mechanical characteristics of the arrangement. In situations where adjustment is required after installation, significant costs are accrued to make the necessary adjustment. Another disadvantage is that there may be insufficient lighting to provide the visibility for the physical pointer itself. Moreover, severe limitations as to the position and shape of the indicating device in the vehicle are imposed by a strictly mechanical indicating arrangement.

As early as 1977, there have been proposals in the patent literature which would have the effect of obviating certain of the disadvantages noted above. In U.S. Pat. No. 4,037,196, there is disclosed a visual indicating arrangement for automotive vehicles, particularly those having five or more forward speeds such as are embodied in trucks or the like. The patent describes the provision of a number of microswitches mounted on the housing for engagement with the shift bars of the transmission. The arrangement further contemplates that the microswitches are connected to a coder which generate binary coded decimal signals representing the shift lever position and the output of the coder is used to drive a seven-segment light emitting diode (LED). Despite the early suggestion of a seven-segment LED digital display unit as the visual indicator for a device of the present type, to date there has been no utilization of such a system as far as applicant is aware.

In the intervening years, it has become common practice to provide electrical signals which are indicative of the condition of the transmission, which electrical signals are utilized in the computer control of the engine. In two recently issued patents, namely U.S. Pat. Nos. 4,882,572 and 4,896,135, it has been proposed to utilize the signals normally generated for use with the engine control computer in an arrangement for visually indicating the position of the transmission shift lever so as to obviate the problems relating to mechanical arrangements noted above. The provision in both of these patents is to provide a logic circuit which will receive the normally provided signals and to provide an output signal which is indicative of each of the positions of the shift lever and to turn on a liquid crystal display in accordance with the output signals. In each of the patents, the output signal is transmitted to a liquid crystal display which serves as the visual indicator for the device. Here again, even though the two patents are assigned to Delco and General Motors respectively, to date there has been no commercial utilization of a liquid crystal display in actual commercial operation. Consequently, there still exists a need for a cost effective display device which will obviate the disadvantages of the mechanical pointer type indicating device heretofore utilized.

It is an object of the present invention to fulfill the above-described need. In accordance with the principles of the present invention, this objective is achieved by providing a visual indicating device for an automotive vehicle having an automatic transmission operatively shiftable by a lever movable successively through a predetermined sequence of positions including a parking position, a reverse position, a neutral position and a plurality of forward speed positions and an assembly for creating a number of input signals in response to the movement of the lever sufficient to determine the specific position the lever is in. The visual indicating device comprises a housing including a face wall structure presenting within an opaque background a sequence of translucent characters corresponding in sequence with the positions of the lever, the translucent characters including the letter P indicative of the parking position, the letter R indicative of the reverse position, the letter N indicative of the neutral position, and a plurality of distinctive characters indicative of the plurality of forward speed positions. A circuit board is mounted within the housing including leads for receiving and transmitting signals including the input signals of the automatic transmission. An illuminating assembly is carried by the circuit board for illuminating all of the sequence of translucent characters and additionally indicating by illumination one of the sequence of translucent characters corresponding to the position of the lever so as to provide a visual indication of all of the lever positions in sequence and one position corresponding to the position the lever is in. The illuminating assembly includes a number of light emitting diodes equal to the number of translucent characters arranged in the sequence so that there is one light emitting diode associated with each translucent character of the sequence, the light emitting diodes being connected with the leads for energizing the light emitting diodes in a manner determined by the input signals received so as to illuminate the one light emitting diode associated with the translucent character of the sequence corresponding to the position the lever is in so that the illumination of the associated one light emitting diode provides the additional indication by illumination.

In accordance with a preferred embodiment of the invention, the face wall structure includes a separate relatively small concentrated translucent area associated with each translucent character. Each concentrated translucent area has a light emitting diode positioned within the housing in close proximity thereto to provide the additional indication by illumination through the associated translucent area when the associated light emitting diode is energized. Structure is provided for confining the illumination of each light emitting diode to the associated translucent area. In addition, incandescent light bulbs are carried by circuit board and operatively connected with the leads within the enclosure for continuously illuminating the sequence of translucent characters.

In accordance with another embodiment of the invention, the light emitting diodes are positioned within the housing in close proximity to the translucent characters respectively so as to illuminate the same when energized. A structure is provided for confining the illumination of each light emitting diode to the associated translucent character. The light emitting diodes are connected with the leads so that all of the light emitting diodes are illuminated at a predetermined lower intensity except the one light emitting diode associated with the translucent character corresponding with the position the lever is in which is illuminated with a higher intensity to provide the additional indication by illumination.

Another object of the present invention is to provide a device of the type described which is simple in construction, effective in operation and economical to manufacture.

These and other objects of the present invention will become more apparent during the course of the following detailed description and appended claims.

The invention may best be understood with reference to the accompanying drawings wherein an illustrative embodiment is shown.

IN THE DRAWINGS

FIG. 4 is a side elevational view of the device with parts broken away for purposes of clear illustration;

FIG. 5 is a view similar to FIG. 4 except that the face wall structure is displaced from the remaining structure of the device;

FIG. 8 is an enlarged sectional view taken along the line 8—8 of FIG. 4;

FIG. 10 is a front elevational view of another form of a visual indicating device embodying the principles of the present invention;

FIG. 11 is a side elevational view of the device shown in FIG. 10 with certain parts broken away for purposes of clear illustration;

FIG. 12 is a view similar to FIG. 6 of the device shown in FIGS. 10 and 11;

FIG. 13 is an enlarged sectional view taken along the line 13—13 of FIG. 10.

Figure 1:
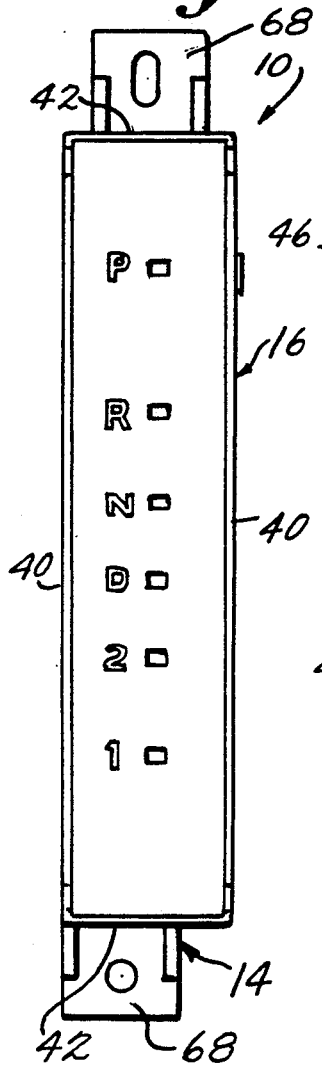
FIG. 1 is a front elevational view of one embodiment of a visual indicating device according to the principles of the present invention.

Referring now more particularly to FIGS. 1-9, there is shown therein one form of a visual indicating device, generally indicated at 10, embodying the principles of the present invention. The form of the device 10 shown in FIG. 1 is particularly suited to be mounted in a floor console. In the embodiment shown, the automatic transmission of the automotive vehicle is of a three-speed type so that the lever is movable successively through a predetermined sequence of positions including a parking position, a reverse position, a neutral position, and the three forward speed positions including a drive position, a second position and a first position. In many of the existing automatic transmissions, the shifting lever has associated with it an electronic switch array which provides four signals which are utilized as input signals in the computer control for the engine. An example of an electronic switch array of this type is disclosed in U.S. Pat. No. 4,896,135, the disclosure of which is hereby incorporated by reference into the present specification. In that patent, there is an indication that the four signals of the electronic switch array can be decoded as by a logic circuit or decoder to give a distinctive indication of the particular position the shiftable lever is in.

In the preferred embodiment of the present invention shown in FIGS. 1-13, the signals of the existing switch array are utilized as input signals to the visual indicating device 10. These input signals can be received and transmitted by four leads whereas the number of lever positions may be five, six or seven depending upon the number of forward speeds provided by the transmission. Consequently, the circuit must have sufficient logic built into it to decode the four input signals so as to derive a greater number of distinct indications. While it is preferred to utilize the signals of the electronic switch array as the input signals of the present device and to decode within the circuitry of the device, it will be understood that it is within the contemplation of to the present invention in its broadest aspects to utilize a number of distinctive input signals equal to the number of lever positions so that decoding within the device is not required.

As shown in FIG. 1, the device 10 of the present invention includes a housing, generally indicated at 12, which includes a main housing structure, generally indicated at 14, and a separate face wall structure, generally indicated at 16, which is adapted to be connected with the main housing structure 14 to form the housing 12. The face wall structure 16 is made of molded plastic in accordance with conventional practices relating to illuminated face plates of this general type. As shown, the face wall structure 16 includes an outer or exterior lamination 18. The lamination is formed of a sheet or film of translucent plastic material having ink laminated or adhered to a surface thereof constituting the interior surface with respect to the face wall structure. The ink is applied to the translucent sheet surface in such a way as to form a sequence of translucent characters corresponding to the sequence of positions of the shift lever. In the embodiment shown, the characters are outlined by the ink so that the characters themselves are translucent. It will be understood that the arrangement could be reversed in that the character could be defined by the ink with the immediate background area being translucent. For present purposes, the term "translucent character" contemplates either arrangement. It will also be understood that the translucent characters can be overlaid with translucent colored inks to enable the light shining through the character to present a visually illuminated color different from that which it naturally emanates. It will also be understood that the characters, though translucent, do not require interior illumination to be visible when there is sufficient exterior light to enable the face wall to be seen. Under these conditions, the characters may appear white on a black background.

The remainder of the face wall structure 16 is molded integrally with the lamination 18 on the interior or ink side thereof in a configuration which includes an opening 20 associated with each translucent character so that light from within the housing will illuminate the translucent characters for visual observation from the exterior side of the lamination 18.

The sequence of the translucent characters for the three-speed transmission of the present exemplary embodiment is first the translucent character "P" which corresponds with the parking position of the lever, second the translucent character "R" which corresponds with the reverse lever position, third the translucent character "N" which corresponds with the neutral position of the shift lever, fourth the translucent character "D" which corresponds with the drive position of the shift lever, fifth the translucent character "2" which corresponds with the shift lever position when the transmission is in its intermediate speed condition, and sixth the translucent character "1" which corresponds with the position of the shift lever when the transmission is in its lowest forward speed condition. For two-speed transmissions, the characters are "PRNDL" and for four-speed transmissions, an "OD" is utilized before the "D" and, in some instances, the "D" may be replaced by "3".

Mounted within the housing 12 is a circuit board, generally indicated at 22. In the embodiment shown, the circuit board 22 carries two light bulb assemblies 24 which are of the conventional incandescent type energized by D-C current to provide illumination through the openings 20 and the translucent characters to the exterior of the housing 12. In addition, the circuit board 22 has mounted thereon an elongated LED support structure, generally indicated at 26, which is preferably molded of plastic material. As best shown in FIG. 5, the LED support structure 26 includes a number of socket bases 28 equal to the number of translucent characters extending from an elongated support body 30. Mounted within each socket base 28 and extending outwardly therefrom is a light emitting diode (LED) 32. As best shown in FIG. 8, the support body 30 has a plurality of supporting arms extending laterally therefrom, the free ends of which are formed into a pair of spaced barblike prongs 34. The prongs 34 are capable of extending through appropriate openings in the circuit board 22 in such a way that they are moved together and then spring apart as the barbs emerge from the opening. In this way, the barbs of the prongs 34 serve to retain the LED support structure 26 in fixedly mounted relation alongside the circuit board 22.

The main housing structure 14 of the housing 12 includes a rear wall 36 having vent apertures 38 therein and a periphery and integral peripheral walls extending from the periphery of the rear wall 36 including two side walls 40 and two end walls 42. Formed on the interior of the end walls 42 are a pair of spaced runners 44 which serve to slidably receive therein the associated ends of the circuit board 22. The rear wall 36 includes a series of exterior wall sections 46 which define a socket 48 opening to the rearward exterior of the rear wall 36. The portion of the socket 48 defined interiorly by the rear wall is formed with a slot 50 and the circuit board 22 includes a series of projections 52 which are adapted to extend through the slot 50 and into the socket 48. The interior periphery of the free edge of the peripheral walls 40 and 42 are formed with grooves therein which are adapted to receive beads 54 on the periphery of the face wall structure 16. The arrangement enables the face wall structure 16 to snap into the open front provided by the main housing structure 14 so as to close the same and retain the circuit board 22 therein in an operative position in fixed relation by virtue of the extension thereof between the runners 44 and through the slot 50 within the socket 48.

In addition to the openings 20 formed in the remainder of the face wall structure 16, there is also formed an opening 56 disposed in closely spaced relation with each opening 20 which leads to a small translucent area of the lamination 18 devoid of ink. Extending rearwardly from each opening 56 as a part of the face wall structure 16 is an annular shroud or light shade 58, the interior of which is large enough to receive therein an associated light emitting diode 32 and its socket base 28. As best shown in FIG. 5, the face wall structure 16 is movable rectilinearly into closed relation with the open end of the main housing structure 14 and, during this movement, the shrouds 58 extend over the light emitting diodes 32 and the rearward ends of the shrouds are shaped to engage the light emitting diode socket base 28. The cooperating relationship is such that the light emitted from each light emitting diode 32 is confined to illuminate only the translucent area which is associated with the particular light emitting diode.

In order to retain the LED support structure 26 in cooperating relation with the face wall structure 16 and the LED socket bases 28 within the shrouds 58, the LED support structure 26 includes a series of tabs 60 extending forwardly from opposite edges of the body 30, which tabs are formed with wedge-shaped lugs. When the structures 16 and 26 are in cooperating relation, the tabs 60 are disposed within spaced reinforcing wall portions 62 of the face wall structure 16 extending between adjacent shrouds 58. As the two structures 16 and 26 are moved into cooperating relation, the lugs of the tabs 60 are deflected by the wall portions 62 and the lugs are finally biased by the tabs to move into openings 64 formed in the wall portions 62.

Figure 7:
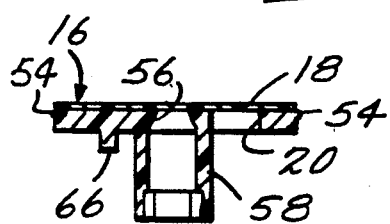
FIG. 7 is a sectional view taken along the line 7—7 of FIG. 6.
Figure 6:
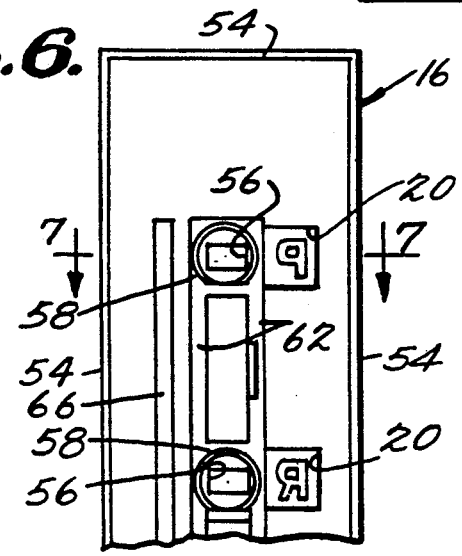
FIG. 6 is a fragmentary elevational view taken along the line 6—6 of FIG. 5.

As best shown in FIGS. 6-8, the face wall structure 16 includes a runner 66 spaced from wall portions 62 for enabling the forward edge of the circuit board to be received therein when the structures 16 and 26 are in cooperating relation to further aid in fixedly supporting the circuit board 22 in its operative position.

Figure 2:
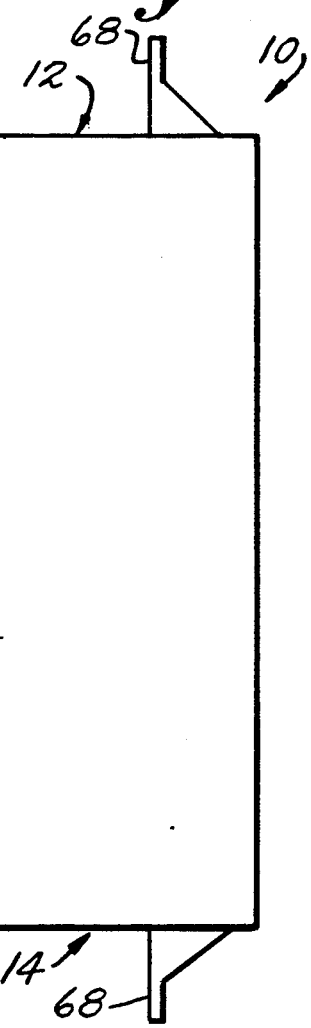
FIG. 2 is a side elevational view thereof.
Figure 3:
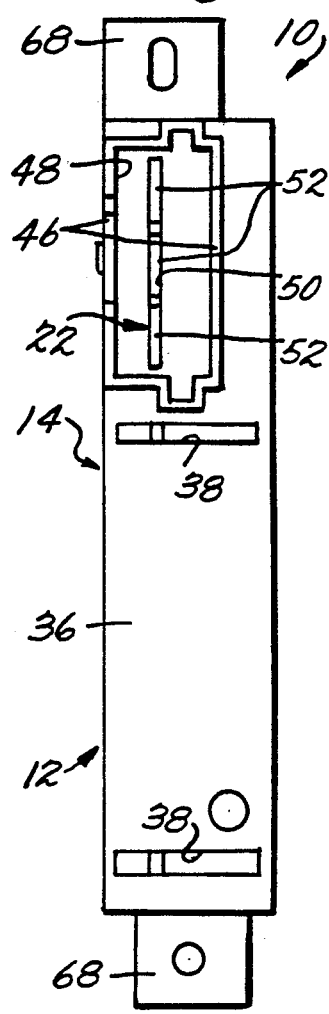
FIG. 3 is a rear elevational view thereof.

As best shown in FIGS. 1-3, in order to provide a convenient means to mount the device 10 within the floor console of the automotive vehicle, a pair of integral mounting brackets 68 are formed on the exterior of the end walls 42. It will be understood that, while the device 10 is particularly suited for mounting in a floor console, it is within the contemplation of the present invention that it could be mounted in the dashboard or any other suitable locale.

Figure 9:
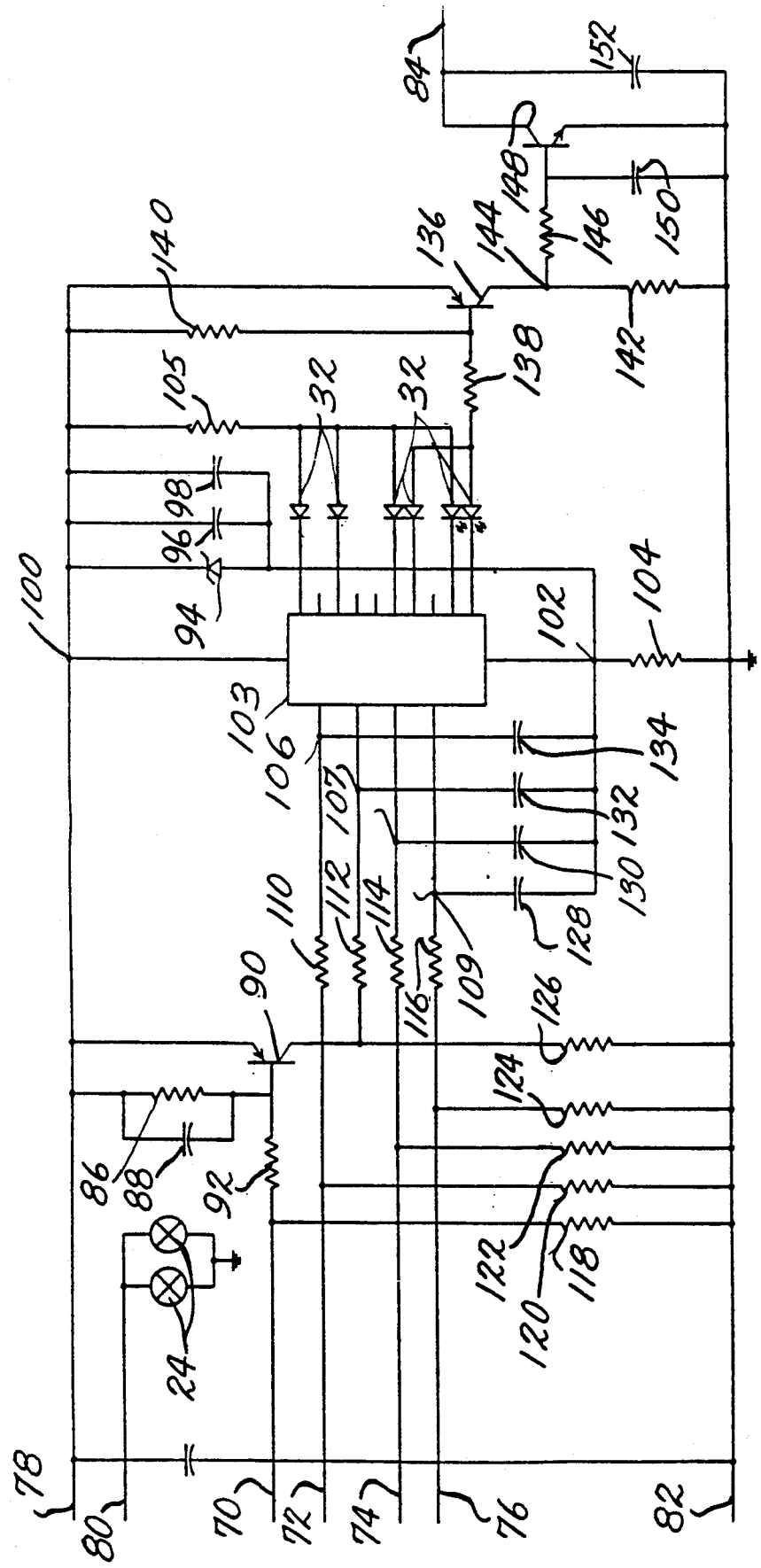
FIG. 9 is a wiring diagram of the circuit embodied in the device shown in FIGS. 1-8.

Referring now more particularly to FIG. 9, there is shown therein a schematic wiring diagram which is configured in accordance with conventional integrated circuit practice within the circuit board 22. The circuitry of the circuit board 22 is adapted to be connected within the electric circuit of the automotive vehicle within which the device 10 is mounted. This connection is made by a plug (not shown) which fits within the socket 48. The plug includes leads which electrically contact leads on the projections 52 of the circuit board 22 which receive signals from and the plug leads and transmit the received signals to the circuitry of the circuit board 22 or receive signals from the circuitry of the circuit board 22 and transmit the signals to the plug leads.

As shown, there are four leads 70, 72, 74, and 76 which extend along the projections 52 of the circuit board 22 so as to be electrically connected when the plug is engaged within the socket 48 to receive the four signals from the switch array of the transmission assembly. The projections 52 also include four other leads 78, 80, 82, and 84 which are electrically connected when the plug is inserted within the socket 48. In this regard, lead 78 is connected to receive a D-C power signal from the ignition switch circuit of the automotive vehicle when the ignition switch is on. Lead 80 receives a D-C power signal from the headlight switch circuit of the automotive vehicle when the headlight switch of the automotive vehicle is turned on. Lead 82 is connected to the reference ground wire (or line) of the circuit board 22. The ground lead of the plug becomes electrically connected to lead 82 when the plug is inserted within the socket 48.

While the ignition switch is on, output lead 84 is either in "active" or "inactive" condition. It becomes active when the automobile transmission is in parking or in neutral position. Otherwise, lead 84 is inactive. Output at lead 84 may be tapped to be used for other automotive circuits, such as Engine Control Module (ECM) or an automatic door lock control circuit.

The output from lead 78 is inputted to each input lead of resistor 86 and capacitors 87 and 88. Each of the other leads of resistor 86 and capacitor 88 are connected to the base of transistor 90. Resistor 86 and capacitor 88 cooperate with resistor 92 to properly bias transistor 90, so that transistor 90 will operate as an invertor. Note that the emitter of transistor 90 is also connected to lead 78. The other lead of capacitor 87 is connected to the reference ground. Capacitor 87 help eliminate some of the noise from lead 78.

The output from lead 78 is also inputted to the anode of zener diode 94 and capacitors 96 and 98. Zener diode 94 limits and clamps the potential difference between two points 100 and 102, while capacitors 96 and 98 help reduce or eliminate some of the noise from lead 78.

Lead 78 is connected to the power supply line of decoder 103. Decoder 103 is 4×10, and one of its output lines can be turned "low" by a proper combination of inputs to lines (nodes) 106, 107, 108, and 109. It should be understood that, even though 4×10 decoder is used in the present embodiment, other decoders such as 4×16 can be used as well. Decoder 103 is commercially available, and its operation is well known. Its complete description is deemed unnecessary and is omitted. It may be noted, however, for decoder 103 to function properly, one of its inputs needs to be inverted via transistor 90 and capacitor 88, and biasing resistors 86 and 92.

All decoder output lines which can be selected by proper combination of input values are connected to cathodes of light emitting diodes (LEDs) 32. It may be noted that a certain combination of input values are simply not allowed by switches connected to leads 70, 72, 74, and 76. Thus, those output lines which may be selected by those combination of input values which are not allowed by switches connected to leads 70, 72, 74, and 76 are not connected to any LEDs.

When one of the output lines of decoder 103 is selected by a proper combination of one's at its inputs 106, 107, 108, and 109, the selected output line assumes the value of "low." This creates a sufficient potential difference between the anode and the cathode of the selected diode to allow its conduction and lighting.

The ground lead of decoder 103 is connected to resistor 104. The potential drop across resistor 104 varies depending on power inputted to zener diode 94. If the supply voltage from lead 78 becomes larger than desired, the current through zener diode 94 sharply increases, thus increasing the potential drop across resistor 104. This allows zener diode 94 to maintain a constant voltage drop between two nodes 100 and 102.

The anodes of four of LEDs 32 are all connected to resistor 105, which is, in turn, connected to lead 78. The role of resistor 105 is limit the supply of current through the associated four LEDs 32 which are associated with the reverse and forward speed positions of the lever.

Resistors 110, 114, and 116, disposed at the input leads of decoder 103, operate in coordination with resistors 120, 122 and 124. Each of resistor pairs 110 and 120, 114 and 122, and 116 and 124 are connected in series. Furthermore, each of leads 72, 74, and 76 taps a node between the resistors of a pair.

When one or more of switches connected to 72, 74, and 76 are in closed position, input voltages to corresponding resistors 110, 114, and 116 are set at a "high" level. This level is reflected at corresponding input leads of decoder 103, since there is no substantial conduction of resistors 110, 114, and 116. On the other hand, when one or more of switches connected to leads 72, 74, and 76 are in open position, the reference ground voltage at one end of each of corresponding resistors 120, 124, and 126 is reflected at corresponding input leads of decoder 103. Thus, the voltage level at inputs of decoder 103 depend on the condition of switches connected to 72, 74, and 76. If one of the switches is "on", a voltage at its corresponding input to decoder 103 will be "high". Otherwise, it will be "low".

Resistors 118 and 126 support the inverting circuitry involving transistor 90. If voltage at lead 70 becomes "high", transistor 90 stops conducting. Since resistor 126 is placed between the collector of transistor 90 and the reference ground wires, input voltage at 112 drops to the reference ground voltage level. Resistor 112 transmits value "low" to input 107 decoder. On the other hand, if the switch at lead 70 is left open, the reference ground voltage is transmitted to the base of transistor 90 through resistors 118 and 92. This causes transistor 90 to conduct, and the potential drop across 126 is reflected at input 107 through resistor 112.

One lead of each of capacitors 128, 130, 132, and 134 is connected to inputs of decoder 103. Other lead of each of capacitors 128, 130, 132, and 134 is connected to resistor 104 at node 102. Capacitors 128, 130, 132, and 134 are for debouncing the switches connected to leads 70, 72, 74, and 76, and for eliminating noise before signals can be inputted to decoder 103.

One end of resistor 140 is connected to both lead 78 and the emitter of transistor 136. The other end is connected to the base of transistor 136. Furthermore, the base is connected to resistor 138, whose other end leads to two of LEDs 32. The current from collector of transistor 136 is indirectly routed to the reference ground through resistor 142.

Transistor 136 and resistors 138, 140, and 142 are configured to respond to "on" and "off" condition of two of LEDs 32 connected to resistor 138. When one or both of two LEDs are conducting, the electrical current must pass through resistors 138 and 140. This implies that there must be a potential drop across both resistors. Such potential drops across resistors 138 and 140 bias transistor 136 so that current flows from the emitter to the collector. This fixes a voltage at node 144, which would otherwise be approximately at the reference ground potential during non-conduction of the two LEDs. In short, the voltage at node 144 is controlled by "on" and "off" condition of the two LEDs connected to resistor 138.

One end of resistor 146 is connected to node 144. The other end is connected to the base of transistor 148, which is also connected to capacitor 150. Another end of capacitor 150 is connected to the reference ground. The collector of transistor 148 is connected to output lead 84 and the emitter of transistor is connected to the reference ground. Finally, capacitor 152 bridges lead 84 and the reference ground.

The main function of resistor 146, transistor 148, and capacitors 150 and 152 is control "active" or "inactive" condition of output lead 84, depending on the voltage at node 144. When the voltage at 144 is "high" output lead 84 becomes "active". Otherwise, it becomes "inactive".

Resistors 138, 140, 142, 146, transistors 136, 148, and capacitors 150, 152 collectively perform the following function: when one or both of the two diodes connected to resistor 138 turns "on", output lead 84 becomes "active". Otherwise, output lead 84 is "inactive". In one embodiment, the two diodes correspond to the indicator lights for the parking and the neutral condition of the automatic transmission. Clearly, the output of lead 84 depends on decoded result of various inputs to decoder 103.

As mentioned previously, the output from lead 84 may be used to provide a decoded parking or neutral signal not available from the switch array of the transmission for other automotive circuits such as the Engine Control Module or an automatic door control circuit.

It may be noted that resistors 142, 146, transistors 136, 148, and capacitors 150, 152 are not essential for proper functioning of the present circuit. If output at lead 84 is not desired, resistors 142, 146, transistors 136, 148, and capacitors 150, 152 may simply be omitted from the present circuit. The rest of the circuitry would still function properly.

To provide an illuminated visual indication of the entire sequence of lever positions, the two small light bulbs 24 are connected to 80, which, in turn, is connected to variable voltage instrumentation light line. Output leads of light bulbs are 24 connected to the reference ground. As mentioned above, lead 80 becomes active when headlight of the host automobile turns on; therefore, the light bulbs 24 are "on" only when the headlights of the host automobile are "on".

In addition, when the automobile ignition switch is on, one of the light transmitting diodes 32 will be energized to provide an illuminated visual indication of the position the transmission lever is in. This is accomplished by the illumination of the energized LED visually showing through the associated translucent area 56. Since each area 56 is closely associated with one translucent character, the operator is given an illuminated visual indication as to which position the lever is in.

The device 10, as described above, is considered to be cost effective based upon the present economics relating to the LED state of the art. As the cost of more intense LEDs is lowered, a desired modification to the device 10 is shown in FIG. 10–14. The modified device is generally indicated by the numeral 210 and components which have been retained and remain unchanged are designated by the same reference numerals. The major change is to replace the face wall structure 16 with a modified face wall structure 216. The face wall structure 216 includes a modified laminate 218 which provides translucent characters PRND21 only without the additional translucent areas 56. The remainder of the face wall structure 218 provides openings 220 leading to the translucent characters with shrouds 258 extending therefrom. As before, the shrouds 258 are reinforced by wall portions 262 having openings 264 therein for cooperating with the lugs of the tabs 60 of the LED support structure 26 fixed to the circuit board 22. In this way, the light emitting diodes 32 are mounted so that when energized the illumination of each will be confined to shine through the associated translucent character only.

In addition to the utilization of a modified face wall structure 216, the device 10 also incorporates modifications in the circuitry for the circuit board 22. These modifications include the elimination of the incandescent light bulbs 24 together with the lead 80 and associated circuit components. In the circuitry shown in FIG. 14, the LEDs 32 are connected in the circuit to be illuminated at a low intensity at all times when the automobile ignition switch is on and the one LED corresponding to the position that the transmission lever is in is illuminated at a higher intensity that can be readily visually distinguished. This continuous illumination of all the LEDs 32 at a reduced intensity during daylight hours as well as at night is permissible because LEDs do not produce the heat produced by incandescent light bulbs and require less power to illuminate. It will be understood that the illumination of all the LEDs at once could be made dependent upon the headlight switch as before.

Figure 14:
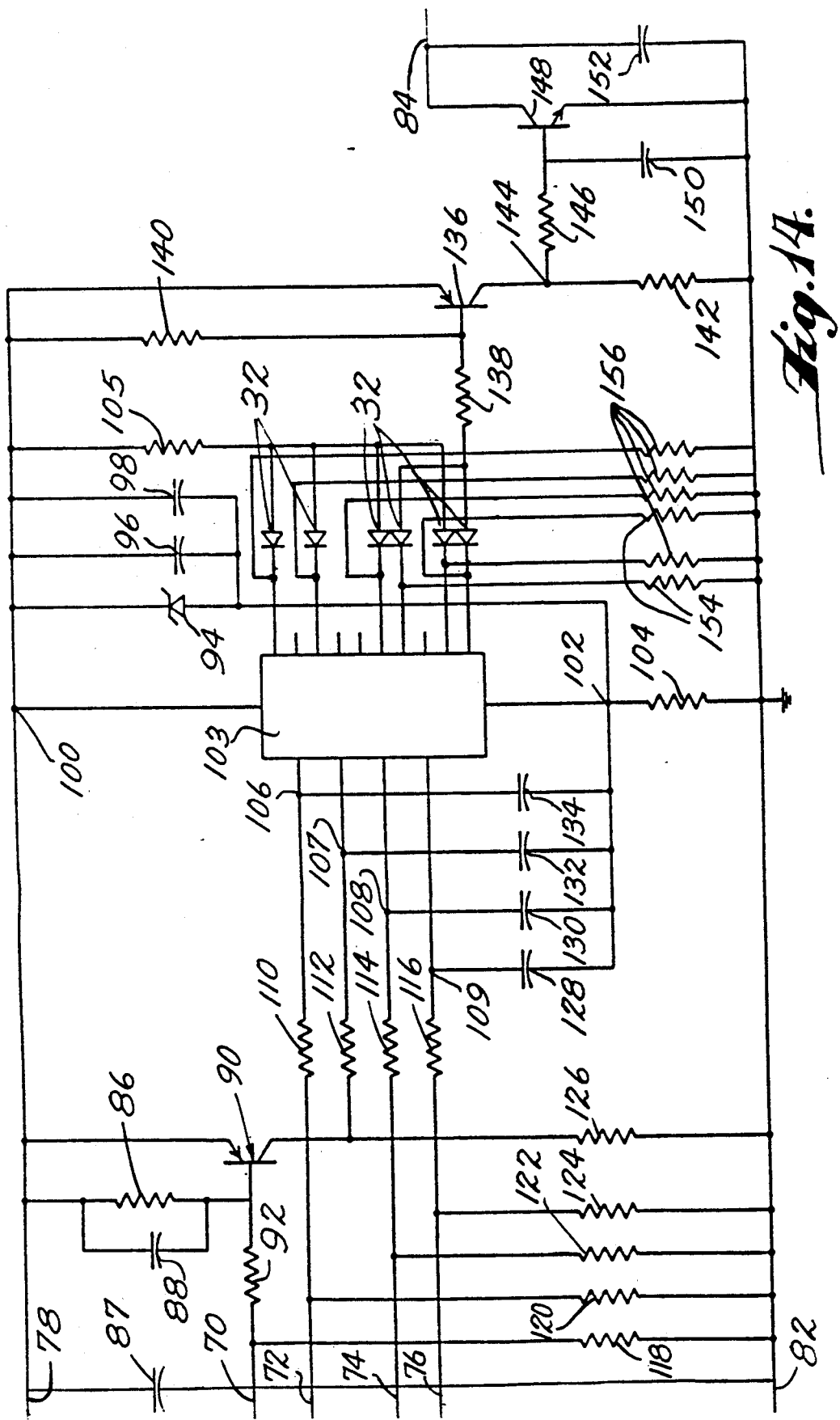
FIG. 14 is a wiring diagram of the circuit utilized in the device of FIGS. 10-13.

Referring now more particularly to FIG. 14, those parts of the circuitry which remain unchanged are indicated by the same reference numerals. The modifications to the circuitry mainly involve resistors 154, 156. One end of each of resistors 154, 156 is connected to one of the cathodes of LEDs 32. The other lead of each of resistors 154, 156 is connected to the reference ground. An unselected output line of decoder 103 is in "high" condition, and during such condition, the parallel combined impedance through the unselected output line of decoder 103 and the resistor 154 or 156 attached to the cathode of the unselected diode is such that it allows the unselected diode to conduct only slightly. This insures partial illumination of the LED which is not selected by the input lines 106, 107, 108, and 109, provided that the ignition switch is turned "on". It may be noted that just-described circuitry involves using a particular type of commercially available decoder; however, if a diode is placed just between the cathode of each LED 32 and the outputs of decoder 103, other types of logic decoders may also be used as well.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A visual indicating device for an automotive vehicle having an automatic transmission operatively shiftable by a lever movable successively through a predetermined sequence of positions including a parking position, a reverse position, a neutral position and a plurality of forward driving speed positions, and means for creating input signals in response to the movement of said lever to determine the specific position of the lever is in, said visual indicating device comprising:

a housing including a face wall structure having an opaque background with a plurality of translucent indicators corresponding with the position of the lever, each of said translucent indicators corresponding to one of the parking position, the reverse position, the neutral position, and one of the plurality of forward driving speed positions, each translucent indicator having a light emitting diode positioned within said housing in close proximity thereto, an illumination confining means positioned adjacent to each light emitting diode to confine the illumination of each light emitting diode to one of said translucent indicators, and a circuit means within said housing including leads for receiving and transmitting signals, including the input signals of the automotive transmission, and for simultaneously illuminating all of the sequence of translucent indicators at a first intensity using said light emitting diodes and for illuminating one of said translucent indicators corresponding to the position of the lever at a second intensity which is higher than said first intensity so as to provide a visual indication of all of the lever positions and the one position corresponding to the position the lever is in.

2. The device as defined in claim 1 wherein said face wall structure includes an exterior laminate providing spaced areas within which said translucent indicators are disposed, the remainder of said face wall structure joining an interior face of said laminate and having openings communicating with the interior face of said laminate within the areas of said translucent indicators.

3. A device as defined in claim 1 wherein the number of leads for the input signals of the automatic transmission is less than the number of light emitting diodes, said circuit means including decoding means between said input signal leads and said light emitting diodes for determining, from said input signals, which position the lever is in and providing an output indicative thereof, for the energization of the one light emitting diode associated with the translucent character of said sequence corresponding to the position the lever is in.

4. A device as defined in claim 3 wherein said leads include an output lead for delivering a signal when said decoding means is providing an output indicative of the position of the lever when in its parking position or neutral position.

* * * * *